Nov. 10, 1936.          A. DIODATI          2,060,727
SPECTACLE HINGE
Filed May 15, 1935
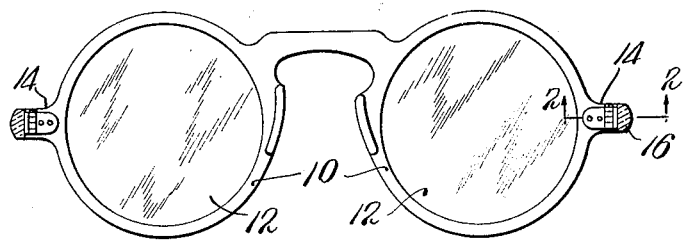
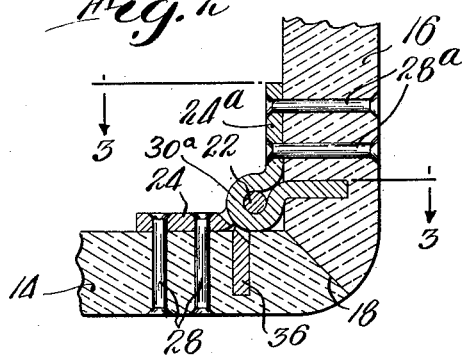
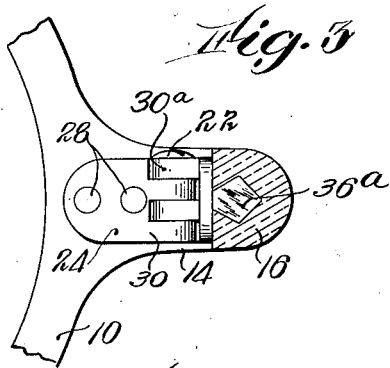
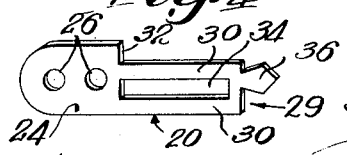
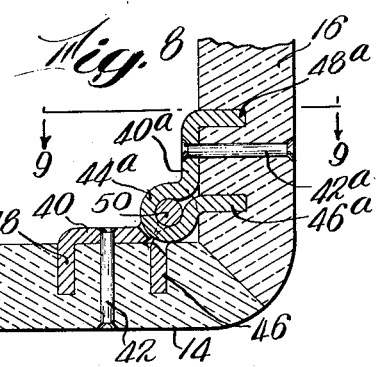
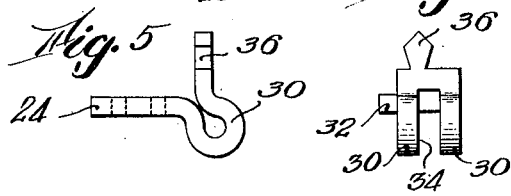
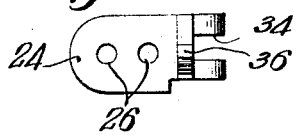
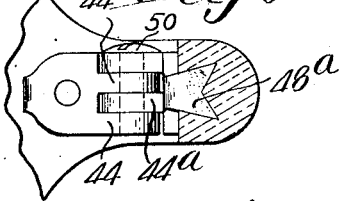
Inventor
AMEDEO DIODATI
Thomson + Thomson Patented Nov. 10, 1936

2,060,727

UNITED STATES PATENT OFFICE 2,060,727

SPECTACLE HINGE

Amedeo Diodati, Boston, Mass., assignor to Marine Optical Manufacturing Company, Roslindale, Mass., a corporation of Massachusetts Application May 15, 1935, Serial No. 21,543

3 Claims. (Cl. 88—53)

This invention relates to improvements in ophthalmic mountings and more particularly to a temple hinge connection between the temples and the frame. The invention resides in the structural design of the hinge parts and the method of manufacture of these parts.

It is an object of the present invention to form a temple hinge from blanks which may be stamped out to a standard size, which blanks are pressed into shape to provide integral loop-shaped pivot ears, two of the stamped blanks cooperating by interfitting of the pivot ears to provide the hinge.

A further object of the present invention is to provide a temple hinge comprising two complemental hinge parts of exactly the same size and shape, each part having a base portion which may be riveted to one of the parts which are hinged together such as the frame or the temple, and also formed with a stud or anchoring portion adapted to be imbedded in the material forming the frame or the temple to cooperate with the rivets in forming a rigid connection.

Various additional advantages of my construction will be more readily apparent from the following description taken in connection with the attached drawing, in which:

Fig. 1 is a view showing in elevation the frame and lenses, and showing in section the hinge temples;

Fig. 2 is a sectional view of the hinge joint taken on the plane indicated 2—2 in Fig. 1;

Fig. 3 is a detailed section taken on the plane indicated 3—3 in Fig. 2;

Fig. 4 is a view in perspective of the stamping from which one of the hinge parts is formed;

Fig. 5 is a plan view of the hinge part after it has been bent to shape;

Fig. 6 is an end view of the hinge part shown in Fig. 5;

Fig. 7 is a front view of the hinge part shown in Fig. 5;

Fig. 8 is a detailed sectional view similar to Fig. 2 but showing a modified structure; and Fig. 9 is a sectional view taken on the plane indicated 9—9 in Fig. 8.

The present invention relates to ophthalmic mountings generally, but more specifically to such mountings as are made of non-metallic material such as shell, celluloid, zylonite, pyroxylin, etc., in which it is necessary to connect the temple members to the end portions of the frame by a metallic hinge.

In the drawing the ophthalmic mounting disclosed includes a lens frame 10 having lenses 12 mounted therein and having laterally directed end portions 14 to which the temple members 16 are connected by hinge joints. The frame 14 and temples 16 are formed with beveled end surfaces 18 adapted to engage when the parts are at an approximate right angle, as indicated in Fig. 2.

Each of the metallic hinges is formed from blanks 20 stamped to the shape shown in Fig. 4. Two of the parts 20 cooperate to form a hinge connection and are secured together by a screw 22. As shown in Fig. 4, the left-hand portion of the stamping 20 forms a hinge plate 24 provided with rivet-receiving holes 26. The hinge plate seats flatly against the lateral extension 14 of the frame 10 and is fixed thereto by a pair of rivets 28. The right hand portion of the stamping 20 shown in Fig. 4 and indicated 29 is somewhat narrower than the hinge plate 24 by the provision of a step 32 and is formed with a longitudinal slot 34. This portion is bent into a closed loop as in Fig. 5 to form a pair of pivot ears 30, the space therebetween being defined by the slot 34. The extreme right-hand end of the stamping, as shown in Fig. 4, is provided with a spur or anchoring portion 36 which, as the blank is bent to shape, is brought to a right angle with respect to the hinge plate 24, and as shown in Fig. 2 is imbedded in the body of the frame extension 14 on the pivot side of the rivets 28.

Two of these hinge parts are brought into interfitting relation as shown in Figs. 2 and 3. The complemental hinge part as shown includes a hinge plate 24A fastened by rivets 28A to a temple 16 and has pivot ears 30A interfitting with respect to the pivot ears 30 and is provided with an anchoring projection or stud 36A which is imbedded in the body of the temple 16. It will be understood that the screw 22, which holds the hinge part together, is threaded into the lowermost pivot ear 30 and by tightening or loosening the screw, the relative freedom of pivotal movement between the parts is determined.

A modified construction of the hinge is illustrated in Figs. 8 and 9, the construction being similar to that first described in that the hinge parts are formed from duplicate blanks which are shaped by bending to provide interfitting pivot ears. The base portion 40 of one of the hinge parts is shown fixed by a single rivet 42 to the frame extension 14 and is provided with loop-shaped pivot ears 44 similar to the pivot ears previously described. The hinge part has an anchoring projection 46, similar to the anchor 36 in Fig. 2, but in addition has a second anchoring projection 48 at the outermost end of the hinge part which is imbedded in the frame extension 14 on the opposite side of the single rivet 42 from the projection 46. The construction of the hinge part, which is fixed to the temple 16, is exactly similar, having a base 40A and fastening rivet 42A, ears 44A and anchoring projections 46A and 48A. The parts are connected by a screw 50. When a single rivet is used, as in this modification, the provision of additional anchoring projections such as shown is desirable in order to form a rigid connection which will not become loosened in use.

I claim:

1. A hinge for use in an ophthalmic mounting comprising a pair of members, each of identical size and shape, each member being formed of sheet metal and consisting of an apertured plate portion, a narrower ear portion and a spur portion, the spur portion being arranged substantially perpendicular to the plate portion and being joined to the latter by the ear portion only, said ear portion forming a pair of loop-shaped ears of width substantially one-fourth the total width of the plate portion intermediate said plate portion and said spur portion and offset outwardly and laterally from the planes of said plate portion and said spur portion, the outer edge of one of said ears coinciding with one longitudinal edge of the plate portion and the outer edge of the other ear being offset relatively to the other longitudinal edge of the plate portion a distance substantially equal to the width of an ear, and a screw pivotally connecting the ears of the two members.

2. A hinge for use in an ophthalmic mounting comprising a pair of members, each of identical size and shape, each member being formed of sheet metal and consisting of an apertured plate portion, a narrower ear portion and first and second spur portions, the first spur portion being arranged substantially perpendicular to the plate portion and being joined to the latter by the ear portion, the second spur portion being positioned at the outer end of the plate portion and being also arranged substantially perpendicular to the plate portion, said ear portion forming a pair of loop-shaped ears of width substantially one-fourth the total width of the plate portion intermediate said plate portion and said first spur portion and offset outwardly and laterally from the planes of said plate portion and said first spur portion, the outer edge of one of said ears coinciding with one longitudinal edge of the plate portion and the outer edge of the other ear being offset relatively to the other longitudinal edge of the plate portion a distance substantially equal to the width of an ear, and a pivot pin connecting the ears of the two members.

3. A hinge for use in an ophthalmic mounting comprising a pair of members, each of identical size and shape, each member being formed of metal and consisting of an apertured plate portion, a narrower ear portion and a spur portion, the spur portion being arranged substantially perpendicular to the plate portion, said ear portion forming a pair of loop-shaped ears of width substantially one-fourth the total width of the plate portion offset outwardly and laterally from the plane of the plate portion, the outer edge of one of said ears coinciding substantially with one longitudinal edge of the plate portion and the outer edge of the other ear being offset relatively to the other longitudinal edge of the plate portion a distance substantially equal to the width of an ear, and a pin pivotally connecting the ears of the two members.

AMEDEO DIODATI.